(No Model.) 2 Sheets—Sheet 1.
W. H. JOHNSON.
AUTOMATIC CHECK ROW PLANTER.
No. 272,702. Patented Feb. 20, 1883.
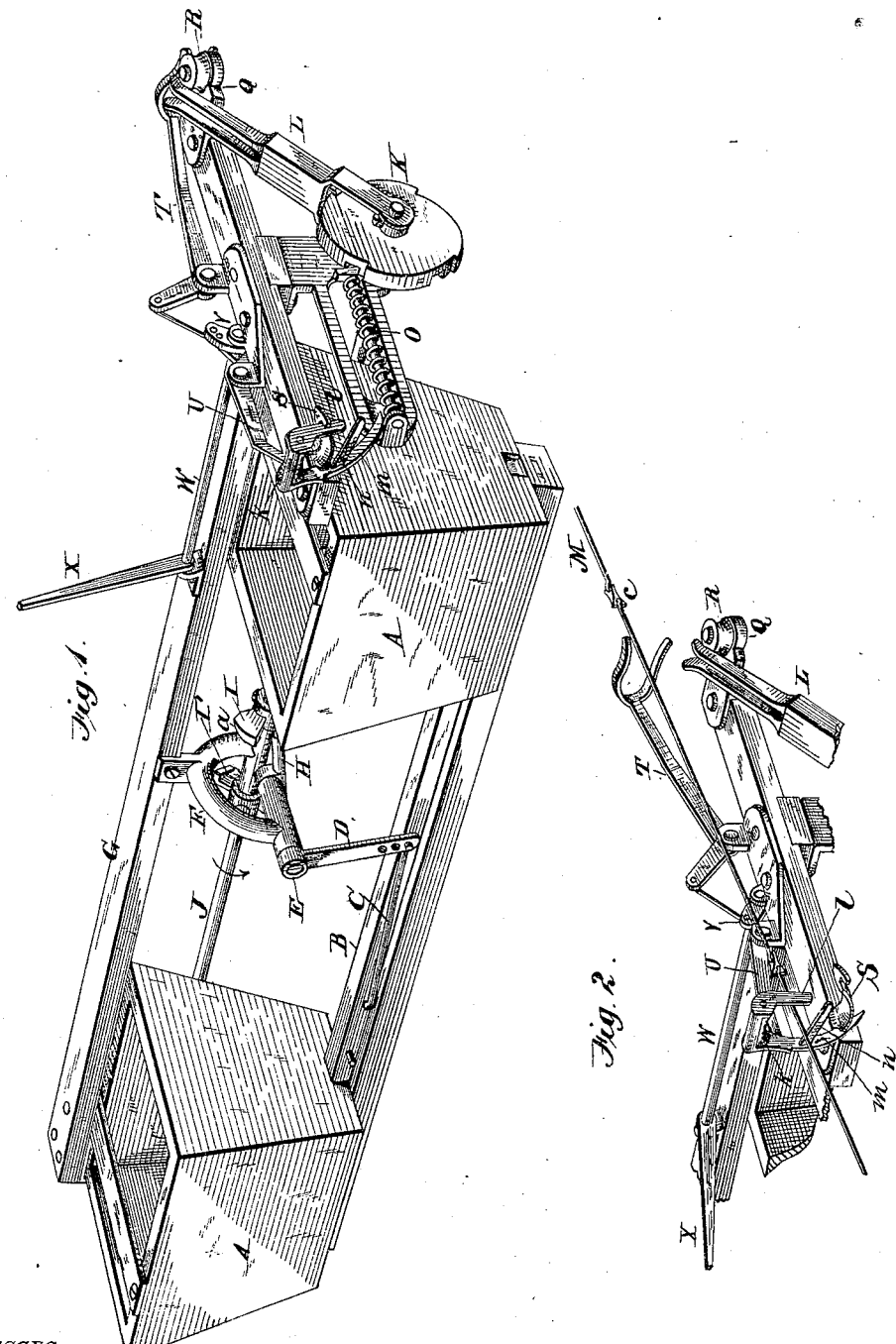
WITNESSES:
W. H. H. Knight
Newton Wyckoff
INVENTOR
W. H. Johnson
By Philip T. Dodge
Attorney (No Model.) 2 Sheets—Sheet 2.
W. H. JOHNSON.
AUTOMATIC CHECK ROW PLANTER.
No. 272,702. Patented Feb. 20, 1883.
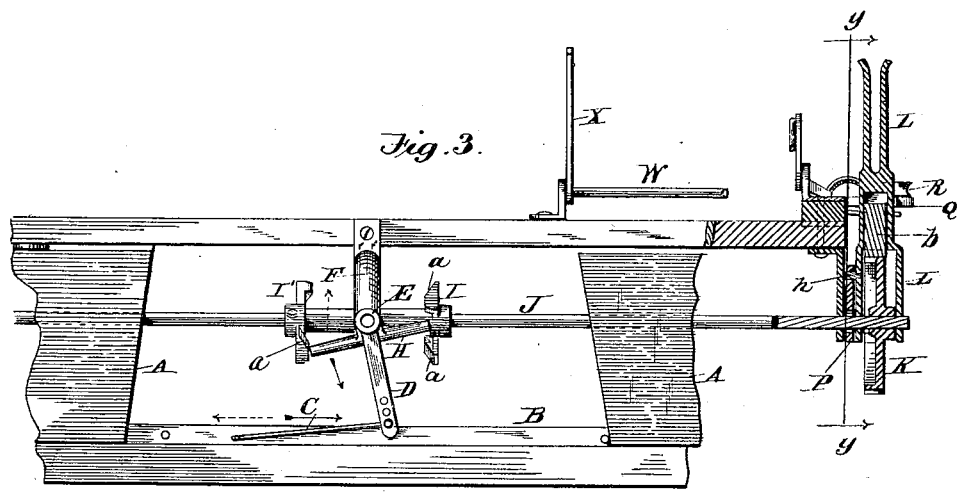
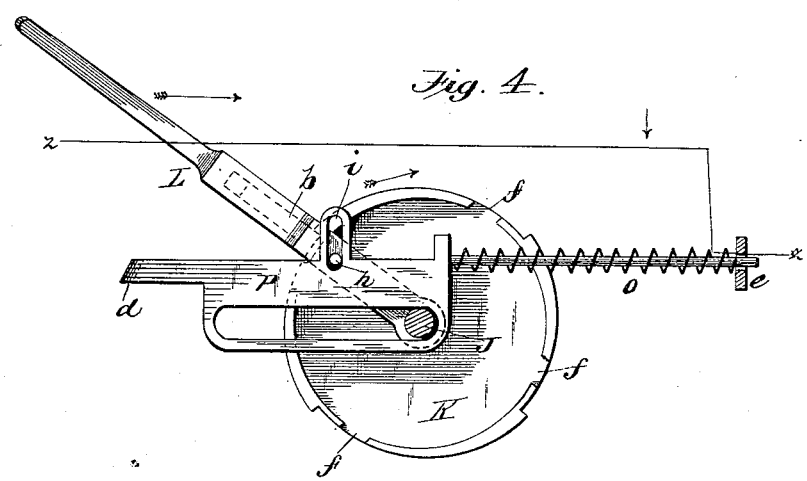
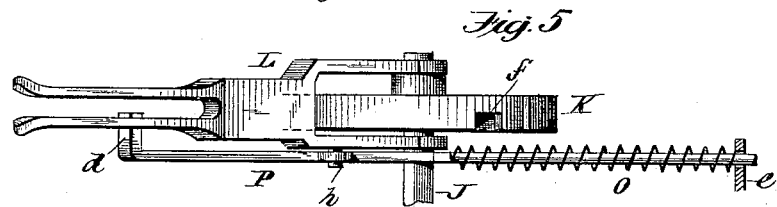
WITNESSES:
W. H. Knight
Newton Wyckoff
INVENTOR
W. H. Johnson
By Philip T. Dodge,
Attorney

UNITED STATES PATENT OFFICE.

WILLIAM H. JOHNSON, OF STERLING, ILLINOIS, ASSIGNOR TO THOMAS A. GALT AND GEORGE S. TRACY, OF SAME PLACE.

AUTOMATIC CHECK-ROW PLANTER.

SPECIFICATION forming part of Letters Patent No. 272,702, dated February 20, 1883.

Application filed September 8, 1882. (No model.)

*To all whom it may concern:*

Be it known that I, WILLIAM H. JOHNSON, of Sterling, in the county of Whiteside and State of Illinois, have invented certain Improvements in Automatic Check-Row Planters, of which the following is a specification.

This invention relates to that class of automatic mechanism for operating the "dropping" devices of corn-planting machines which are commonly known in the art as "check-rowers," the system embracing the combination of a fixed wire or cord stretched across the field, and provided with buttons or enlargements at regular intervals, and devices mounted upon the machine to be operated by the enlargements upon the wire as the machine traverses the field.

The present invention relates to improvements in the details of the mechanism by which motion is transmitted from the operating-wire to the dropping devices; to means whereby the operator may, without dismounting, disconnect the operating-wire from the machine, and in various details, which will be hereinafter explained.

Inasmuch as the devices forming the subject-matter of my invention are applicable to existing machines as commonly used at the present day and understood by those skilled in the art, I have deemed it unnecessary to illustrate in the accompanying drawings more than the seed boxes or hoppers of the machine, the remaining parts of which may be of any ordinary or suitable construction.

Referring to the drawings, Figure 1 represents a perspective view of the seed boxes or hoppers of an ordinary corn-planting machine having my improvements applied thereto, the parts being shown in an operative position. Fig. 2 is a perspective view, showing the parts with which the wire co-operates in position to release said wire from the machine. Fig. 3 is a vertical section transversely of the machine in line with the main shaft of the dropping mechanism. Fig. 4 is a view on the line *y y* of Fig. 3. Fig. 5 is a horizontal section on the line *z z*, Fig. 4.

A A represent two seed boxes or hoppers, and B the horizontal reciprocating slide, of ordinary construction and arrangement, passing through the base of the hoppers for the purpose of delivering the seed intermittingly therefrom. This slide may have seed cells or pockets formed therein, in which case it will serve as the direct means of discharging the seed; or it may be used to operate rotary or other ordinary mechanism for effecting the delivery of the seed. The reciprocating motion is communicated to the slide B by means of a link or pitman, C, connected to a depending vibratory arm, D, attached to a horizontal rock-shaft, E. In order that the movement of the slide may be increased or diminished, the arm D is provided with a series of holes at different distances from its axis, into either of which the link C may be engaged at will.

The rock-shaft E is supported in an arm or bracket, F, bolted firmly to and extending downward from a transverse bar, G, which latter is bolted firmly to the seed boxes or hoppers, or otherwise sustained rigidly upon the machine. The forward end of the rock-shaft is provided with a transverse bar or arm, H, the two ends of which are acted upon alternately by means of cams or hubs I and I', mounted upon a transverse revolving shaft, J. Each cam or hub I I' is secured firmly to the shaft, and has two arms extending in opposite directions therefrom, as shown, the arms of one cam standing at right angles to those of the other, as plainly represented in Figs. 1 and 3. When the cams are rotated, by means of the shaft J, in the direction indicated by the arrow, the cam I first strikes one end of the arm H, and, depressing the same, turns the rock-shaft E and arm D in such a manner and in such direction as to move the seed-slide B to the left. After this action the cam I passes the end of the arm H, and the cam I' in turn acts upon the opposite end of said arm, thereby tipping the same in the opposite direction from that in which it was tipped by cam I, thus moving the rock-shaft and arm D in such manner as to move the feed-slide to the right. It will thus be seen that by the action of the two cams I and I' alternately upon opposite ends of the rocking bar H a reciprocating motion is transmitted to the feed-slide B.

In the practical operations of the machine it is frequently necessary, in completing the action at the ends of the field, to operate the feed-slide by hand instead of by the automatic devices. It is therefore necessary that the automatic devices shall be of such construction as, under certain conditions, to leave the slide free to be moved by hand. It is also essential that while the seeding devices are being actuated by the automatic mechanism shown, said devices shall be locked during the intervals between the actions of the mechanism, as otherwise there would be danger of the seeding devices being thrown out of position by the rocking motion or lateral inclination of the machine. Provision is made for thus permitting the action of the mechanism by hand, and for preventing the movement of the parts accidentally by beveling or cutting away the rear faces of the operating-cams I and I' on the inner side, as shown at $a$, thus permitting the end of the arm H to swing past said faces after the cams have been slightly rotated. As a result of this construction, the slide and its connections are left, after each action of the operating cams, in a locked position, due to the fact that the cam last in action stands opposite the end of the vibrating arm H, as shown in Fig. 3, in such position as to prevent it from moving. Upon giving a slight rotation to the cams, which is usually effected by moving the lever L by hand, the cam which last acted upon the arm H is carried clear of the same, thereby bringing its beveled face $a$ in such relation to the end of the arm H as to release the latter and permit the feed-slide to be operated by hand. It will thus be seen that after each action of the cams the slide and its connections are left in a locked condition; but that they may be readily unlocked and left free to be moved by hand.

Passing now to the devices by which the intermittent rotary motion is transmitted to the shaft J, it will be seen that the outer end of the shaft has fixed firmly thereon a wheel, K, having four ratchet-teeth in its periphery at equal distances apart. For the purpose of communicating motion to this wheel a vibratory arm, L, forked at its lower end, is mounted loosely upon the end of the shaft J, astride of the wheel, and provided, as shown in Figs. 3 and 4, with a pawl or dog, $b$, to engage with the teeth of said wheel. The upper end of this arm L is forked or slotted, as shown, to admit the operating-wire M, which will be stretched across the field, as usual, and provided at regular intervals with buttons or enlargements $c$ of such size that as they encounter the vibratory arm L they will cause the same to swing backward, and thereby, through its dog $b$, impart the required rotation to the wheel $k$, each button or enlargement passing upward over the upper end of the vibratory arm when the latter reaches the limit of its backward motion. A spring, O, the arrangement of which will be hereinafter more fully described, serves to throw the vibratory arm L forward to its original position after the action of each operating-button.

In order to prevent the wheel K and its connections from being carried beyond the proper point by the momentum which they acquire from the action of the operating-lever, it is necessary to provide a stop by which the wheel shall be brought positively to a state of rest as soon as the action of the lever thereon ceases. This stop consists, as shown in Figs. 4 and 5, of a shoulder, $d$, formed upon one end of a horizontally-sliding plate, P, one end of which is slotted and mounted upon the main shaft J, while its opposite end, which may be in the form of a spindle, is passed through a fixed guide, $e$, as clearly shown in Fig. 4. The wheel K, provided on its inner face with notches or shoulders $f$, into which the locking-shoulder $d$ is engaged by a backward motion of the plate P, is secured by providing the vibratory lever, as shown in Figs. 3 and 4, with a stud, $h$, which engages in a vertical slot, $i$, formed in the plate, so that as the lever is carried backward it carries with it the plate P until the locking-stud $d$ engages in the corresponding notch, $f$, of the wheel. The spring O, by which the vibratory lever is returned to its normal position, as before stated, is applied around the rear end of the sliding plate P and bears against the guide $e$, as shown in Fig. 4. Thus applied the spring serves to effect the forward movement of both the stop-plate and the vibratory arm, causing the stop-plate to disengage from and release the wheel as the lever swings forward preparatory to the next movement of the wheel.

For the purpose of supporting and guiding the operating-wire M in suitable position to act upon the vibratory lever L, the machine is provided at one end with a guiding and supporting plate, Q, having on its outer end the pulley R, which rides against the outer side of the wire to prevent the same from falling from the machine, the plate and pulley being located in advance of the vibratory arm. The end of the machine is also provided, in rear of the vibratory arm, with a curved plate, S, which rides beneath the operating-wire to assist in sustaining and guiding the same.

In order that the operator, riding upon the machine, may disconnect or release the wire therefrom at will without dismounting, I mount upon the end of the machine two vertically-swinging arms, T and U, connected at their inner ends by links to an arm, V, on the outer end of a rock-shaft, W, which latter is provided with a hand-lever, X, at its inner end, so that by operating said lever the ends of the two arms T and U may be thrown upward at will. The arm T extends forward and terminates at the forward end in a jaw or fork open at one side, that jaw being arranged in such position that when the operating-wire is in action it rides through or between the two arms of said jaw. The arm U is provided at its rear end with a roller, $k$, designed to ride on top of the operating-wire and hold the same down in its place. This arm is also provided at its end with the three depending arms $l$, $m$, and $n$.

The arms l and m extend downward past the opposite ends of the roll, on opposite sides of the operating-wire, to keep the latter from passing off of the guiding-plate S. The arm n extends downward and outward beneath the roll, and is intended to lie beneath the operating-wire when the latter is in action, its purpose being to cause the wire to ride outward from the side of the machine when the arm U is elevated.

During the operation of the machine the parts occupy the position represented in Fig. 1, the wire passing through and being held and guided by the ends of the arms T and U. When, however, it is desired to have the operating-wire cease its action the attendant operating the lever X thereby elevates the ends of the arms T and U, which lift the wire M away from the lever and the guiding devices, so that it is supported wholly by arms T and U, whereupon the inclined arm n of the arm U and the downwardly-inclined arm at the end of the arm T cause the wire to ride laterally off of the machine and fall to the ground.

While it is preferred to construct the lifting-arms T and U in the peculiar form represented, it is to be distinctly understood that my invention is not restricted to the arms in said form, the essential feature of the invention in this regard consisting in the employment of an arm or arms, under the control of the attendant, arranged to act upon the wire and lift the same clear of the mechanism. It will be manifest to the skilled mechanic that the arms may be modified in many respects which will suggest themselves without changing essentially their mode of action in this respect.

Having thus described my invention, what I claim is—

1. In an automatic check-rowing mechanism, the rocking arm H, extended on opposite sides of its axis, in combination with the two alternately-operating cams I and I', constructed and arranged, substantially as described, to act upon opposite ends of the arm, whereby the latter is vibrated and locked, as set forth.

2. In a check-rowing mechanism, the rocking arm H, extended on both sides of its axis, in combination with two intermittingly-rotating cams I and I', arranged to operate alternately and on opposite ends of said arm, each cam having the inner face substantially at right angles to its axis, and an inclined surface, a, extending backward from said face, as and for the purpose shown.

3. In combination with the ratchet-wheel, the vibratory operating-lever, and the reciprocating stop devices connected with said lever by a vertical slot and pin, as described, whereby said parts are caused to move in unison without the employment of intermediate connections.

4. In combination with the ratchet-wheel and its operating-lever, the sliding stop-plate connected with said lever by a slot and pin, and provided with a stem or spindle having a spiral spring mounted directly thereon, as shown.

5. In an automatic check-rowing mechanism, the combination, with an operating-wire and check-rowing devices, of a tripper, under the control of the driver, adapted to engage with the operating wire or cable and lift the same positively out of engagement with the mechanism.

6. In combination with the vibratory lever of a check-rowing mechanism, a stationary operating-wire, M, to actuate the same, and vertically-movable arms engaging with said wire and connected with the lever, arranged to be operated by the attendant at will for causing said arms to disengage the operating-wire.

7. In combination with the planter having the stationary wire-guiding devices thereon, the lever L, and the two vertically-swinging arms T and U, each having the lip or arm to pass beneath the operating-wire, substantially as described, whereby the said arms are adapted to lift the wire out of engagement with the dropping mechanism.

8. In an automatic check-rowing mechanism, the combination of the lever L, plate Q, and pulley R with the vertically-swinging arm T, having its forward end forked to embrace the stationary operating-wire, substantially as shown, whereby said arm is adapted to lift said wire out of engagement with the pulley and lever.

9. In an automatic check-rowing mechanism, the combination, with the lever L and the guide S in rear of the same, of the vertically-swinging arm U, provided with the lip L to retain the wire upon said guide and with the lip or finger n, inclined, as shown, to direct the wire outward from the guide when the arm is elevated.

10. In an automatic check-rowing mechanism, the combination of the hand-lever X, shaft W, and arms T and U, constructed and arranged substantially as described and shown.

11. In an automatic check-rower, the combination of the guide S, and the vertically-swinging arm U, provided with a roller, k, to hold the operating-wire downward, and with an inclined lip, n, to elevate the wire and discharge the same laterally.

WILLIAM H. JOHNSON.

Witnesses:
JAMES B. PATTERSON,
ELIJAH A. EMMONS.